(12) United States Patent
Fujie et al.

(10) Patent No.: US 7,372,654 B2
(45) Date of Patent: May 13, 2008

(54) NOISE REDUCTION SYSTEM, DISK STORAGE UNIT, HARD DISK DRIVE AND NOISE REDUCTION METHOD

(75) Inventors: Yoshihiro Fujie, Fujisawa (JP); Yoshihiko Terashita, Yamato (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 1047 days.

(21) Appl. No.: 10/346,527

(22) Filed: Jan. 16, 2003

(65) Prior Publication Data

US 2003/0147173 A1    Aug. 7, 2003

(30) Foreign Application Priority Data

Jan. 21, 2002    (JP)    ............................. 2002-012192

(51) Int. Cl.
*G11B 15/18* (2006.01)
*G11B 17/00* (2006.01)
*G11B 19/02* (2006.01)

(52) U.S. Cl. .................. 360/69; 360/137; 381/71.4

(58) Field of Classification Search .............. None
See application file for complete search history.

(56) References Cited

U.S. PATENT DOCUMENTS 6,157,116 A * 12/2000 Sampietro et al. .......... 310/334

7,139,401 B2 * 11/2006 Culman et al. ............ 381/71.7

FOREIGN PATENT DOCUMENTS

| JP | 03-113888 | 5/1991 |
|----|-----------|--------|
| JP | 04-241291 | 8/1992 |
| JP | 04-344195 | 11/1992 |
| JP | 00-293806 | 10/2000 |
| JP | 00-337435 | 12/2000 |
| JP | 01-319420 | 11/2001 |
| JP | 01-320794 | 11/2001 |

\* cited by examiner

*Primary Examiner*—William Korzuch
*Assistant Examiner*—Daniell L. Negrón
(74) *Attorney, Agent, or Firm*—Bracewell & Giuliani LLP (57) ABSTRACT

An active noise canceller outputs a noise pattern learning request signal to a hard disk drive causing the hard disk drive to perform a predetermined operation, receives noise at this moment through a sound-receiving unit, and stores, in a nonvolatile memory unit, a relationship between the noise and a head operation data signal output from the hard disk drive. Based on the operation data signal outputted from the hard disk drive, the active noise canceller generates a noise-canceling sound while making a reference to the above relationship stored in the nonvolatile memory unit. Therefore, the signal processing needs a low degree of response for operating the noise-canceling sound.

14 Claims, 9 Drawing Sheets

NOISE REDUCTION SYSTEM, DISK STORAGE UNIT, HARD DISK DRIVE AND NOISE REDUCTION METHOD

FIELD OF THE INVENTION

This invention relates to a disk storage unit which stores data on a disk. More particularly, the invention relates to a disk storage unit which reduces noises generated therein, and a noise reduction system that realizes such a function.

BACKGROUND ART

As a disk storage unit of this kind, there has been known a hard disk drive which stores data by magnetizing a magnetic material evaporated on a disk by using a magnetic head.

In recent years, the hard disk drive has been widely used in general households owing to widespread use of personal computers in general households and owing to the advent of digital electric household appliances such as TVs, set-top boxes and TV game devices incorporating the hard disk drive.

An important function required by the hard disk drive under the above circumstances may be noise reduction.

The operational noise of the hard disk drive can be reduced by:
(1) a method of suppressing the propagation of a generated noise by wrapping the hard disk drive with a sound-absorbing material;
(2) a method of reducing the noise itself generated by the hard disk drive by reducing the diameter of the disk, reducing the rotational speed of the disk, reducing the operation speed of the head, or improving the bearings; and
(3) a method of canceling the noise by using an active noise canceller which generates a sound with a phase opposite to that of the operational noise of the hard disk drive.

According to the above method (1), however, a problem arises that is concerned with how to radiate heat generated by the hard disk drive and, hence, cost and size of a hard disk drive housing.

According to the above method (2), it becomes necessary to newly develop a hard disk drive or parts thereof for reducing noise which would cause problems such as increased cost of development, drop in a data transfer rate, and increase in a unit bit cost. When the disk rotational speed and the head operation rate are lowered, in particular, it becomes very difficult to reduce the noise while maintaining the performance.

According to the method (3), the active noise canceller must have an improved response performance in the signal processing and, hence, cannot be cheaply realized.

SUMMARY OF THE INVENTION

This invention aims at solving the above technical problems, and has a principal object of providing a noise reduction system which is capable of excellently suppressing the noise without increasing the cost.

To achieve the above object according to the present invention, attention is given to the following points.

Noises generated by a hard disk drive can be classified into, for example, steady noise generated by the rotation of a disk, and impulse-like noise generated during the seek operation of a head. As for the steady noise among them, each frequency component of the noise changes mildly with the passage of time and estimation of noise components at a predetermined time can be made to some extent. Therefore, even if the noise is suppressed by the above active noise canceller, the response performance in the signal processing is not so much affected. As for the impulse-like noise, on the other hand, it is difficult to estimate when and what kind of noise may occur. Therefore, it is necessary to calculate a noise-canceling sound to be generated after the active noise canceller receives the noise, which requires a high degree of response performance for the signal processing.

The noise reduction system of the invention, therefore, employs the following means. Namely, the noise reduction system to which the invention is applied comprises a disk storage unit having a disk capable of storing data and a head writing or reading data to or from the disk, an active noise canceller generating a noise-canceling sound to reduce a noise generated by the disk storage unit, and a memory unit storing relationship between operational states and noises in the disk storage unit, wherein the disk storage unit outputs to the active noise canceller an operation data signal representing an operational state of the disk storage unit when it operates, and the active noise canceller generates the noise-canceling sound by referring to the relationship stored in the memory unit based on the operation data signal outputted from the disk storage unit.

Owing to this constitution, the active noise canceller generates a noise-canceling sound through a simple operation based on the data (operation data signal) related to the operational state outputted from the disk storage unit by referring to the relationship between the operational state of the disk storage unit and the noise, which has been stored in the memory unit in advance. Therefore, fast response of the signal processing is not required as compared to the case where the noise-canceling sound is calculated after receiving the noise.

In this case, in particular, the disk storage unit may output the operation data signal as a signal that represents the operational state of the head. Then, the active noise canceller is allowed to easily recognize the operation of the head which is a principal cause of impulse-like noise in the disk storage unit and to effectively suppress the impulse-like noise.

Further, the active noise canceller may detect noise other than the noise generated by the operation of the head, and determine the noise-canceling sound based on the characteristics of the detected noise. It is, then, made possible to effectively suppress the steady noise such as a rotational sound of the disk or any other external sound.

In this case, further, it is desired that the active noise canceller receives the noise generated when the disk storage unit has performed a predetermined operation, and stores the noise in the memory unit in connection with the operational state of the disk storage unit, so that a relationship between the operational state of the disk storage unit and the noise is stored in the memory unit.

In this case, further, it is desired that the disk storage unit performs the predetermined operation based on a request signal outputted by the active noise canceller, the active noise canceller outputs request signals with a plurality of patterns, and the memory unit stores relationships between a plurality of operational states of the disk storage unit corresponding to the plurality of patterns and the noises generated under the plurality of operational states. In this case, typical operations of the disk storage unit are stored in the memory unit as requested by the active noise canceller, so that the noise can be easily estimated by the active noise canceller.

Further, the invention can be comprehended to be concerned with the following disk storage. That is, the disk storage to which the invention is applied comprises a disk storage unit having a disk capable of storing data, a vibration-generating unit generating vibration for reducing an operational sound generated by the disk storage unit, a sound-receiving unit receiving the operational sound which the disk storage unit generates at the time of driving, and outputting to the vibration-generating unit an operational sound signal based on the operational sound, and a memory unit storing, in an associative manner, the operational state and a received sound signal based on the operational sound-generated when the disk storage unit is operated in a predetermined operational state. The vibration-generating unit generates the vibration based on the operational sound signal outputted by the sound-receiving unit and the relationship between the sound receiving signal and the operational state stored in the memory unit.

In the above, the received sound signal is preferably the operational sound signal outputted from the sound-receiving unit when the disk storage unit is operated in the predetermined state.

It is desired that the disk storage includes a level judging unit which, when the vibration-generating unit has generated vibration for reducing the vibration generated by the disk storage unit, detects the operational sound reduced by the vibration from the operational sound signal outputted by the sound-receiving unit, and judges whether the operational sound is smaller than a predetermined level. This makes it possible to judge whether the operational sound generated by the disk storage unit has been reduced to a level smaller than the predetermined level.

In this case, it is desired that the level judging unit adjusts the level of vibration to be generated by the vibration-generating unit when the operational sound reduced by the vibration is not smaller than the predetermined level. This makes it possible to favorably reduce the operational sound of the disk storage unit.

Further, the disk storage unit has an enclosure or housing containing at least the disk storage unit. If the vibration-generating unit is formed integrally with the housing, it is possible to reduce the space occupied by the vibration-generating unit.

The memory unit may be present on a disk that constitutes the disk storage unit.

Further, the invention can be comprehended to be concerned with the following hard disk drive. That is, the hard disk drive to which the invention is applied comprises a disk capable of storing data, a head writing or reading data to or from the disk, a head control unit controlling the operation of the head and outputting a seek operation signal representing the seek operation of the head, and a memory unit storing the seek operation signal outputted by the head control unit.

Further, the invention can be comprehended to be concerned with the following hard disk drive. That is, the hard disk drive to which the invention is applied is characterized in that the head control unit is connected to an active noise canceller that outputs a noise-canceling sound for reducing the noise from the seek operation, and sends the seek operation signal to the active noise canceller.

Further, the invention can be comprehended to be concerned with the following noise reduction method. That is, the noise reduction method to which the invention is applied comprises a first step of causing a hard disk drive to perform a predetermined operation and receiving a noise generated due to said predetermined operation, a second step of storing the noise received and the predetermined operation in an associative manner, a third step of identifying an operational state of the hard disk drive in a predetermined driving period, and a fourth step of identifying the predetermined operation corresponding to the operational state identified in the third step, and outputting a noise-canceling sound for reducing the noise corresponding to the predetermined operation.

In this case, it is desired that the first step receives a unsteady noise generated when the hard disk drive is caused to perform a predetermined unsteady operation, and a steady noise generated when the hard disk drive is caused to perform a predetermined steady operation, the second step stores the unsteady noise received and the unsteady operation in an associative manner, the third step identifies the unsteady operational state and/or steady operational state of the hard disk drive during a predetermined driving period, and the fourth step outputs a first noise-canceling sound for reducing the unsteady noise corresponding to the unsteady operation and a second noise-canceling sound for reducing the steady noise corresponding to the steady operation.

This makes it possible to separately estimate the unsteady noise such as seek operation sound of the head, and the steady noise that can be easily estimated, such as disk rotation sound and external sound.

It is desired that the noise reduction method further comprises a fifth step of receiving the noise reduced as a result of outputting the noise-canceling sound in the fourth step, and a sixth step of comparing the noise received in the first step with the noise received in the fifth step to verify the validity of characteristics of the noise-canceling sound outputted in the fourth step.

In this case, it is desired that, when an average level of the noise received in the first step is smaller than an average level of the noise received in the fifth step by more than a predetermined value, the sixth step judges that the characteristics of the noise-canceling sound outputted in the fourth step are valid. Further, when a rise in a peak level of the noise received in the first step is not greater than a predetermined value with respect to a peak level of the noise received in the fifth step, the sixth step may judge that the characteristics of the noise-canceling sound outputted in the fourth step are valid.

BRIEF DESCRIPTION OF THE DRAWINGS

FIG. 2 is a diagram illustrating a procedure for processing a program that operates in a signal processing unit in the hard disk device shown in FIG. 1, wherein FIG. 2(a) is a flowchart illustrating the outline of the basic processing in the program and FIG. 2(b) is a flowchart of a timer interrupt processing effected during the processing of FIG. 2(a).

PREFERRED EMBODIMENTS OF THE INVENTION

The invention will now be described in detail based on the embodiments shown in the accompanying drawings.

Figure 1:
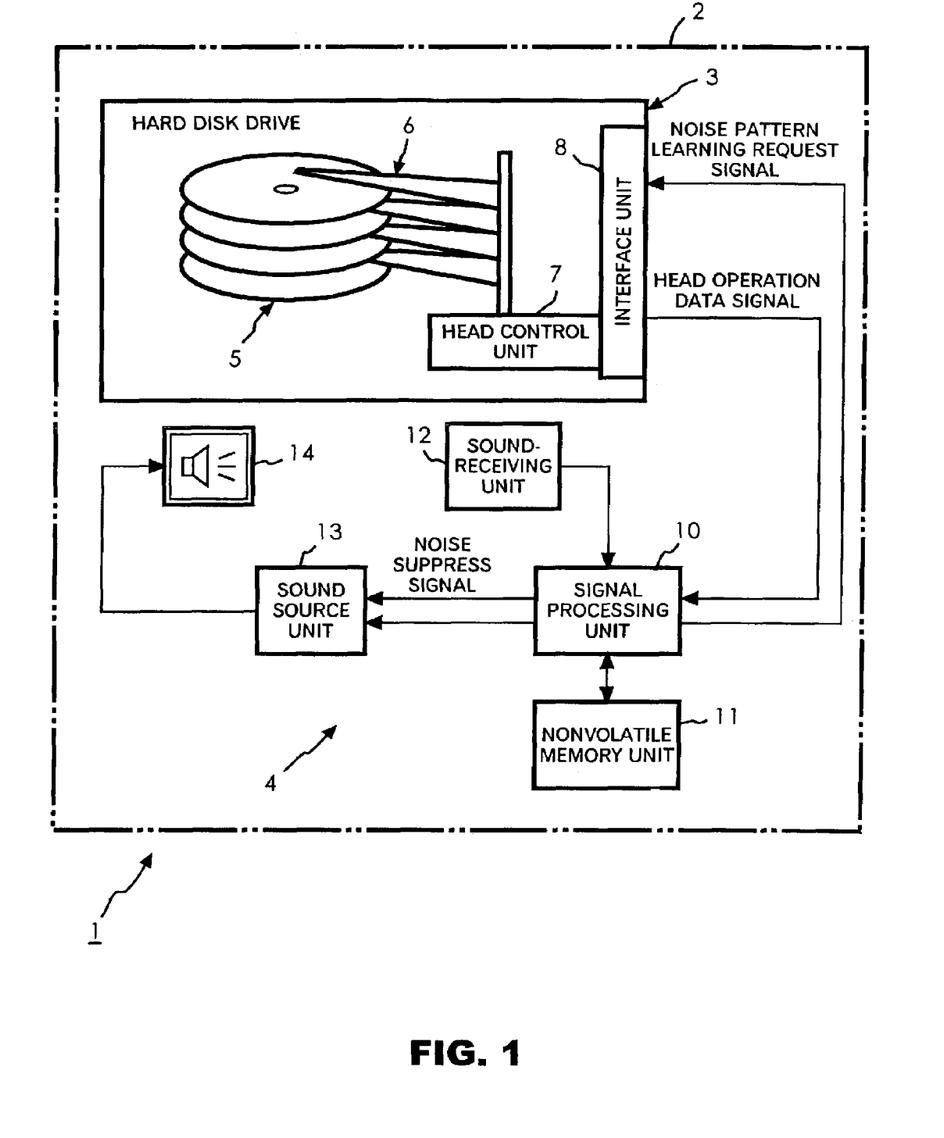
FIG. 1 is a diagram of the whole constitution of a hard disk device which schematically illustrates an embodiment of the invention.

FIG. 1 is a block diagram schematically illustrating the entire constitution of a hard disk device 1 in one embodiment. The hard disk device (noise reduction system, disk storage unit) 1 includes a hard disk drive 3 and an active noise canceller (vibration-generating unit) 4 in a housing 2.

The hard disk drive 3 includes at lease one magnetic disk (disk) 5 for storing data, at least one magnetic head (head) 6 for writing and reading data to and from the magnetic disk 5, a head control unit 7 for controlling the operation of the magnetic head 6, and an interface unit 8 connected to the head control unit 7 for sending and receiving signals to and from the outside. The hard disk drive 3 further includes a rotation control unit for the magnetic disk 5 and a data read/write control unit, which are not shown.

On the other hand, the active noise canceller 4 includes a signal processing unit (level judging unit) 10 connected to the interface unit 8 of the hard disk drive 3, and a nonvolatile memory unit (memory unit) 11 connected to the signal processing unit 10. To the signal processing unit 10 are further connected a sound-receiving unit 12 that receives the noise generated by the hard disk drive 3, and a sound source unit 13 controlled by the signal processing unit 10. The sound source unit 13 controls the operation of a speaker 14 attached to the housing 2 of the hard disk unit 1 to thereby control the sound generated from the speaker 14. Single or plural sound-receiving units 12 and speakers 14 may be provided depending upon the design of the hard disk drive 3 and the housing 2. The sound-receiving unit 12 sends a received sound signal (operational sound signal) corresponding to the received sound to the signal processing unit 10. It is desired that the speaker 14 is arranged at a position close to the principal noise source and that the sound-receiving unit 12 is arranged at a position remote from the principal noise source. The speaker 14 may be stuck to, for example, a top cover constituting the housing 2.

As will be described later, the nonvolatile memory unit 11 stores a program that runs after expanded in a program region of the signal processing unit 10, and a plurality of noise pattern data for causing the hard disk drive 3 to operate in a plurality of predetermined operation patterns. The signal processing unit 10 reads the program from the nonvolatile memory unit 11 to execute it, and sends the noise pattern data read from the nonvolatile memory unit 11 through a processing in the program to the hard disk drive 3 as a noise pattern learning request signal.

As another processing in the program, after the signal processing unit 10 outputs the noise pattern learning request signal to cause the hard disk drive 3 to perform a seek operation in a predetermined operation pattern, the signal processing unit 10 relates the head operation data signal (seek operation signal) outputted from the hard disk drive 3 in response to the operation pattern to the noise (or received sound signal itself) of the hard disk drive 3 estimated from the received sound signal that is outputted from the sound-receiving unit 12, and stores the relationship in the nonvolatile memory unit 11. Thus, the operation of the magnetic head 6 in the hard disk drive 3 is related to the noise generated from the hard disk drive 3, and its relationship is stored in the nonvolatile memory unit 11.

Next, concrete operations of the hard disk device 1 will be described in detail.

In the hard disk device 1, the active noise canceller 4 causes the hard disk drive 3 to perform predetermined operations based on the program that runs in the signal processing unit 10, learns what noises are generated from such operations, and, based on the result of this learning, generates a sound with a phase opposite to that of a noise generated from the hard disk drive 3 when the hard disk drive 3 is actually operating, to thereby cancel or reduce the noise of the hard disk drive 3 that propagates to the outer side of the housing 2.

FIGS. 2 to 9 are flowcharts illustrating the operations in the hard disk device 1 based on the processing procedure of the program in the signal processing unit 10.

Figure 2:
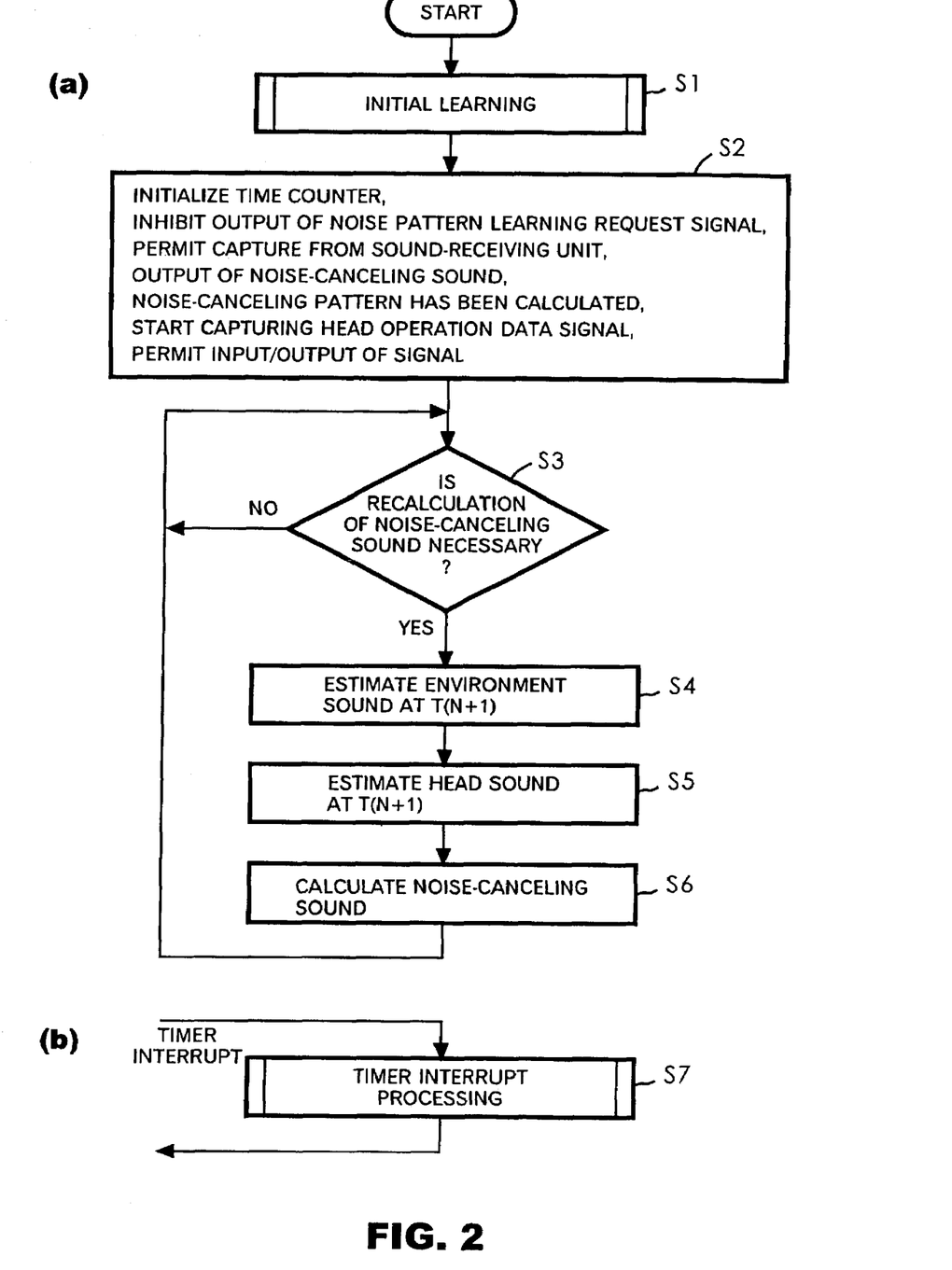

FIG. 2(a) is a flowchart illustrating the basic operation of the signal processing unit 10, and FIG. 2(b) illustrates a timer interrupt processing executed by the signal processing unit 10 in response to a timer interrupt. The timer interrupt processing of FIG. 2(b) is executed at predetermined time intervals set in advance during the processing in FIG. 2(a). The processing starts as a power source of the hard disk device 1 is turned on, and continues so far as the hard disk device 1 is activated.

First, the basic operation of the signal processing unit 10 shown in FIG. 2(a) will be described.

As shown, the signal processing unit 10 learns (initial learning) what noises are generated by the operations of the hard disk drive 3 (step S1). Namely, at step S1, the magnetic head 6 is intermittently operated by the head control unit 7 of the hard disk drive 3 based on the noise pattern learning request signal outputted from the signal processing unit 10. At this moment, the signal processing unit 10 estimates the noise generated from the hard disk drive 3 based on the received sound signal outputted from the sound-receiving unit 12, and stores the estimated noise in the nonvolatile memory unit 11 in association with the head operation data signal outputted from the hard disk drive 3.

Next, the signal processing unit 10 sets various values for canceling the noise when the hard disk drive 3 is operating (step S2). Specifically, the signal processing unit 10 initializes a time counter contained therein, and inhibits the noise pattern learning request signal from being outputted to the hard disk drive 3. The signal processing unit 10 further permits capture of sound from the sound-receiving unit 12 and output of noise-canceling sound from the sound source unit 13. Further, the signal processing unit 10 sets a value indicating that the noise canceling pattern has been calculated, starts capturing the head operation data signal, and permits input and output of signals other than the noise pattern learning request signal. The processes indicated by the set values other than the initialization of the time counter, that is, permitting or inhibiting output of the noise pattern learning request signal, permitting or inhibiting capture from the sound-receiving unit 12, permitting or inhibiting output of the noise-canceling sound, indicating whether the noise canceling pattern has been calculated, indicating whether capture of the head operation data signal is started or inhibited, and permitting or inhibiting input and output of signals may be represented by the respective flags defined in the program. It is assumed here that the above values are set by writing a flag value in a buffer for each flag.

Further, as will be described later, the signal processing unit 10 judges the necessity of recalculating a noise-canceling sound (step S3) based on a recalculation request for the noise-canceling sound set by the timer interrupt processing (step S7). When it is judged at step S3 that it is necessary to recalculate the noise-canceling sound, current time is presumed to be T(N), environmental sound at time T(N+1) is estimated from environmental sound (sound of rotation of the magnetic disk 5 and external sound) measured before the time T(N) (step S4), and noise (magnetic head sound) of the magnetic head 6 at the time T(N+1) is estimated (step S5). As described above, the noise of the magnetic head 6 is estimated at step S5 based on the head operation data signal outputted from the hard disk drive 3, by referring to the relationship between the head operation data signal and the noise-canceling sound stored in the nonvolatile memory unit 11 at step S1.

Further, based on the environmental sound at the time T(N+1) and the noise of the magnetic head 6 estimated at steps S4 and S5, the signal processing unit 10 calculates a noise-canceling sound that is to be generated by the speaker 14 at the time T(N+1) (step S6). After having conducted the processing at step S6 and in case it is judged at step S3 that the noise-canceling sound needs not be recalculated, the flow returns to the entry point of step S3, and the processing is repeated thereafter.

Next, the timer interrupt processing (step S7) of FIG. 2(*b*) will be described in detail. The timer interrupt processing (step S7) is conducted at time intervals $\Delta Tt$ which is determined by the sampling interval of the noise-canceling sound and the received sound, and the depth of the buffer in the sound source unit and the sound-receiving unit. The sampling interval is two times as long as the frequency component of the sound. Therefore, if the frequency component of the sound is at most 10 KHz, the sampling interval will be 50 µS. If the depth of the buffer is 10, then $\Delta Tt$ will be equal to or smaller than 500 µS. Further, a time interval $\Delta T$ between the current time T(N) and T(N+1) is determined by the calculation algorithm of the noise-canceling sound. It is necessary that the processing time for calculating the noise-canceling sound is not longer than the one obtained by subtracting, from $\Delta T$, the processing time needed for the timer interrupt processing.

Figure 3:
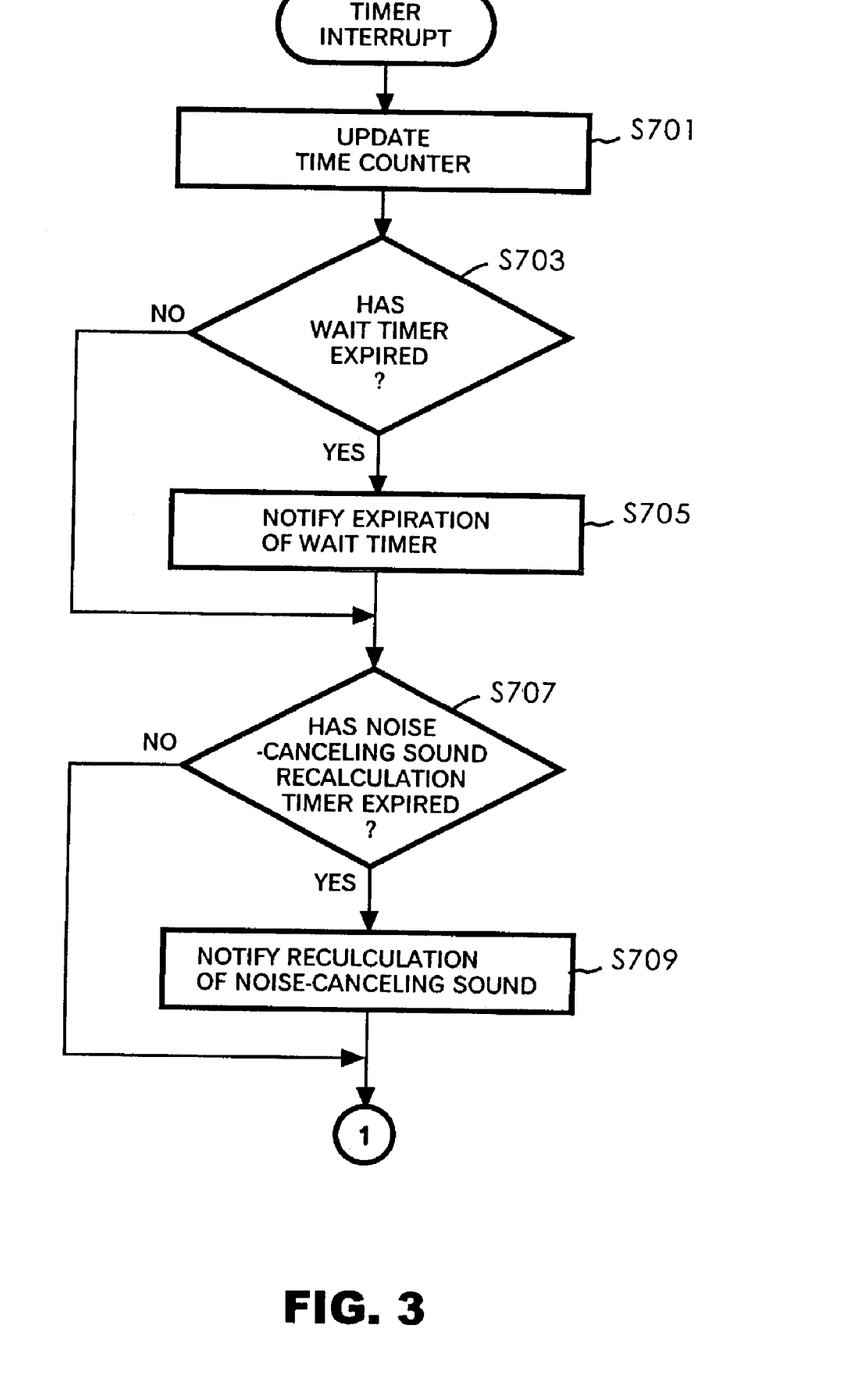
FIG. 3 is a flowchart illustrating, in detail, the timer interrupt processing shown in FIG. 2(b).
Figure 4:
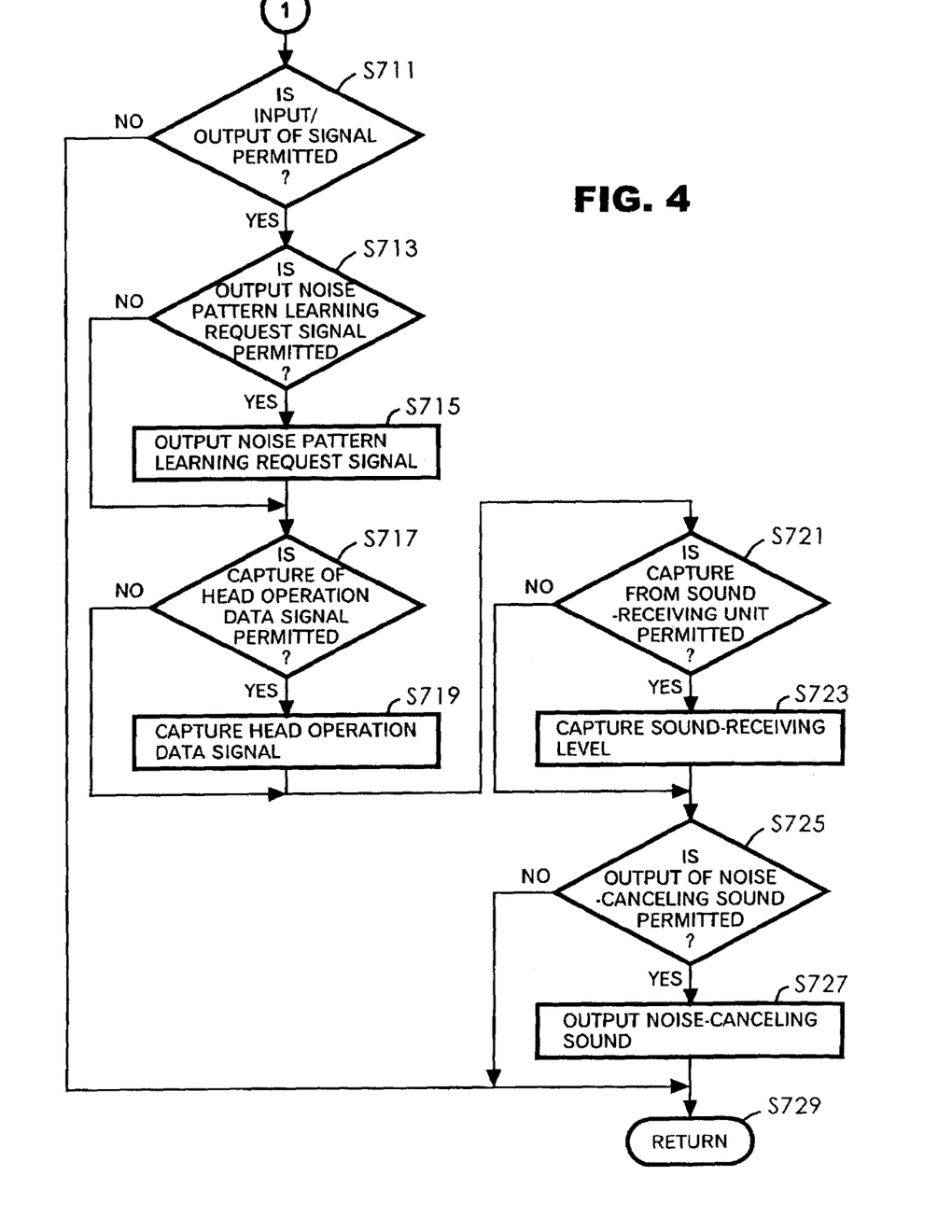
FIG. 4 is a flowchart illustrating the processing that follows the processing of FIG. 3.

FIGS. 3 and 4 show a flowchart illustrating, in detail, the timer interrupt processing (step S7). As shown in FIG. 3, the timer interrupt processing (step S7) first updates the time counter (step S701), and then judges whether a wait timer has expired (step S703). As will be described later, the wait timer expires after a predetermined period of time when, for example, the head is to be stopped by the noise pattern learning request signal from the signal processing unit 10, or the noise of the magnetic head 6 is to be measured. The wait timer is used to count a time in which the magnetic head 6 becomes quiet, a time period for measuring the head sound of the magnetic head 6, or a time period in which the signal processing unit 10 waits or continues to capture signals.

If it is judged at step S703 that the wait timer has expired, the signal processing unit 10 issues a notice of expiration of the wait timer (step S705), and proceeds to the next step S707. On the other hand, if it is judged at step S703 that the wait timer has not expired, the signal processing unit 10 proceeds to step S707 without executing step S705.

At step S707, it is judged whether a noise-canceling sound recalculation timer has expired. The noise-canceling sound recalculation timer counts a predetermined time so that the noise-canceling sound is recalculated every predetermined time to change the noise-canceling sound to be generated. If the noise-canceling sound recalculation timer has expired, the signal processing unit 10 issues a notice of recalculation of the noise-canceling sound (step S709). When the notice of recalculation of the noise-canceling sound is issued at step S709, it is judged at step S3 of FIG. 2(*a*) that the noise-canceling sound must be recalculated. Based on this judgment, the noise-canceling sound is recalculated through step S4 to step S6 in FIG. 2(*a*).

Referring next to FIG. 4, the signal processing unit 10 judges whether the input/output of signals is permitted (step S711). As described above, whether it is permitted to input or output a signal to or from the signal processing unit 10 has been set as a flag in the program, and is judged here by referring to the value of this flag. The signal processing unit 10 returns to the processing of FIG. 2(*a*) (step S729) if it is judged at step S711 that the signal input/output has been inhibited while it proceeds to the next step S713 if it is judged that the signal input/output has been permitted.

At step S713, judgment is made as to whether it is permitted or inhibited to output the noise pattern learning request signal, by referring to the value of a corresponding flag set in the program. If it is judged at step S713 that it has been permitted to output the noise pattern learning request signal, the signal processing unit 10 outputs the noise pattern learning request signal read out from the nonvolatile memory unit 11 to the hard disk drive 3 (step S715), and proceeds to the next step S717. At step S713, if it is judged that it has been inhibited to output the noise pattern learning request signal, the signal processing unit 10 proceeds to step S717 without executing step S715.

At step S717, it is judged whether the signal processing unit 10 is permitted to capture the head operation data signal from the hard disk drive 3, by referring to the value of a corresponding flag set in the program. If it is judged at step S717 that the capture of the head operation data signal has been permitted, the signal processing unit 10 captures the head operation data signal from the hard disk drive 3 (step S719), and proceeds to the next step S721. At step S717, if the capture of the head operation data signal has been inhibited, the signal processing unit 10 proceeds to step S721 without executing step S719.

At step S721, it is judged whether capture of the noise from the sound-receiving unit 12 has been permitted, by referring to the value of a corresponding flag set in the program. If it is judged at step S721 that the capture from the sound-receiving unit 12 has been permitted, the noise (received sound level) is captured from the sound-receiving unit 12 (step S723), and the flow proceeds to the next step S725. If it is judged at step S721 that the noise has not been captured from the sound-receiving unit 12, the flow proceeds to step S725 without executing step S723.

At step S725, it is judged whether output of the noise-canceling sound from the speaker 14 has been permitted, by referring to the value of a corresponding flag set in the program. If it is judged at step S725 that the output of the noise-canceling sound has been permitted, the signal processing unit 10 controls the sound source unit 13 so that the noise-canceling sound is outputted from the speaker 14 (step S727). If it is judged at step S725 that the output of the noise-canceling sound has been inhibited, the signal processing unit 10 returns to the processing of FIG. 2(*a*) without executing step S727 (step S729).

The above timer interrupt processing is effected at predetermined time intervals in the processing illustrated in FIG. 2(*a*) to output the noise pattern learning request signal, capture the head operation data signal, capture the received sound level, or output the noise-canceling sound continuously in the processing illustrated in FIG. 2(a). The values of the flags are set in the processing illustrated in FIG. 2(a) to thereby determine whether the processing of FIG. 2(b) can be executed at each timing point in the processing illustrated in FIG. 2(a).

By performing the processing shown in FIG. 2 as described above, the active noise canceller 4 stores the head operation data signal (operational state of the head) outputted from the hard disk drive 3 in relation to the noise (initial learning), recalculates the noise-canceling sound that is to be generated by the active noise canceller 4 at regular time intervals based on the head operation data signal outputted from the hard disk drive 3, and outputs the noise-canceling sound so that the noise reduction is continuously performed while the hard disk device 1 is in operation.

Figure 5:
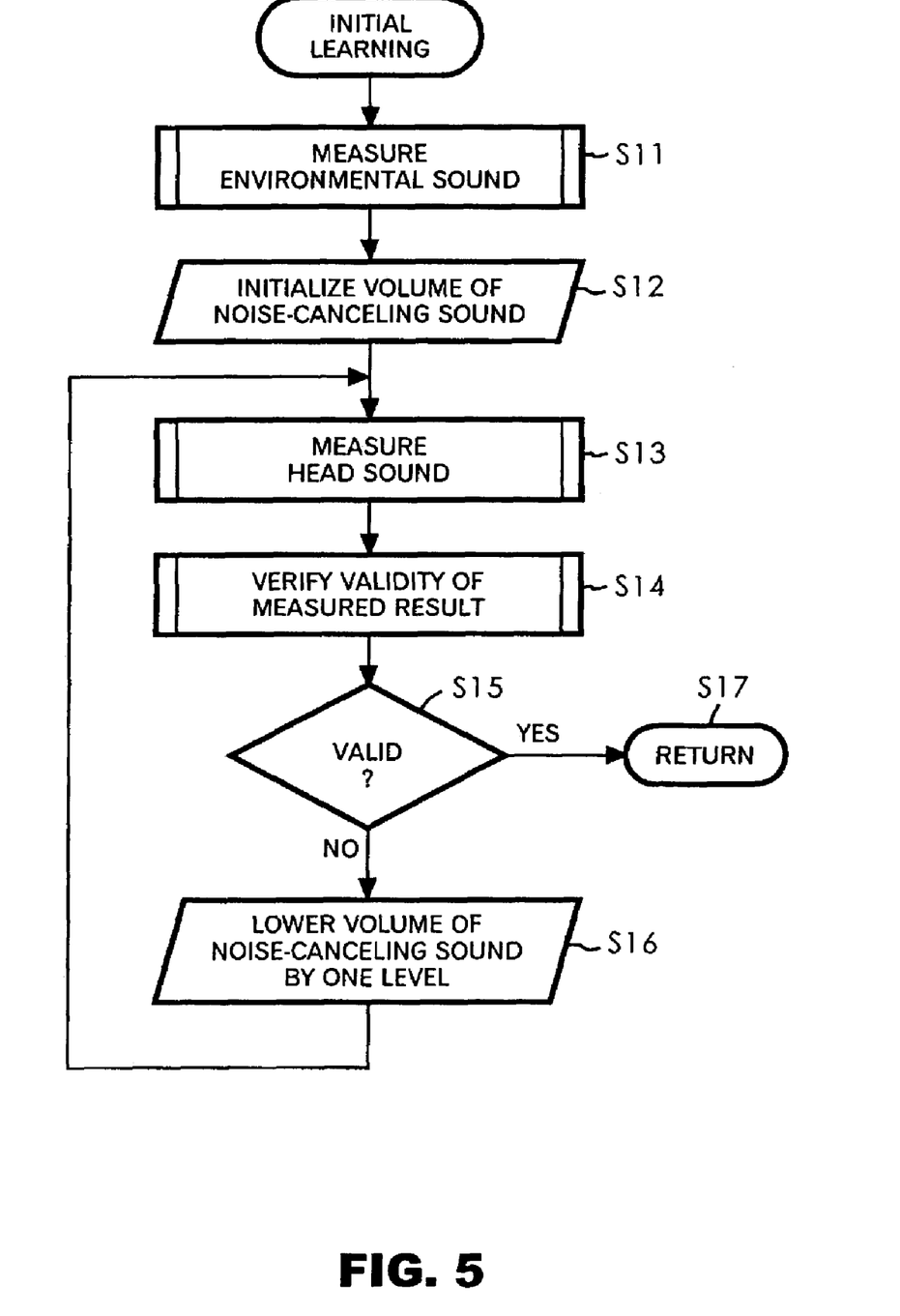
FIG. 5 is a flowchart illustrating, in detail, an initial learning processing shown in FIG. 2(a).

The initial learning processing (step S1) in the flowchart of FIG. 2 will now be described in detail with reference to FIG. 5.

When the relationship between the head operation and the noise is to be initially learned at step S1, the signal processing unit 10 first measures environmental sound (step S11). Here, the environmental sound includes the noise generated by the rotation of the magnetic disk 5 and the noise coming from the outside of the housing 2, each of which is steady noise having frequency components which change relatively slowly with the passage of time. The above steady noise can be distinguished from impulse-like noise generated from the hard disk drive 3 at the seeking time of the magnetic head 6. Next, the volume of the noise-canceling sound is initialized (step S12) based on the environmental sound measured at step S11. Here, a maximum value determined in the development stage that can be permitted as the volume of noise-canceling sound is set as the initial value.

Next, the signal processing unit 10 enables the hard disk drive 3 to perform a predetermined operation to thereby measure the head sound generated during the seek operation of the magnetic head 6 (step S13). The head sound does not steadily change as compared to the environmental sound detected at step S11. Further, the signal processing unit 10 compares the noise generated when the hard disk drive 3 performs the predetermined operation again with the noise existing at the time when the noise-canceling sound is generated from the speaker 14, to verify the validity of the measured result (step S14). It is then determined whether the measured result at step S14 is valid (step S15). If it is judged to be valid, the flow returns to the flowchart of FIG. 2 (step S17). Otherwise, the volume of the noise-canceling sound is lowered by one level (step S16), and the flow returns to step S13 to repeat the succeeding steps. In this way, by repeating step S13 to step S16, the volume of the noise-canceling sound is suitably adjusted to thereby suitably cancel the noise while the hard disk drive 3 is in operation.

Figure 6:
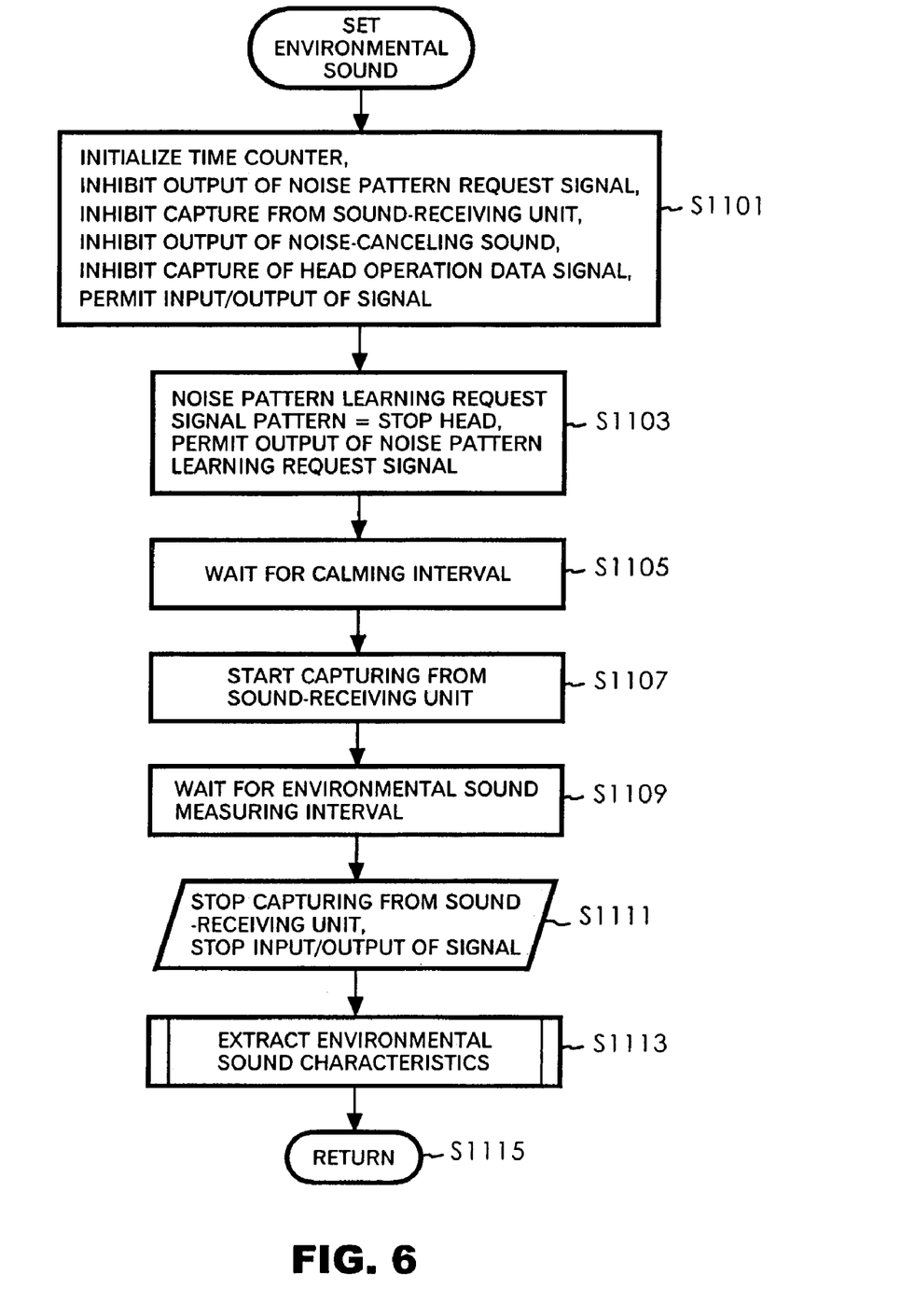
FIG. 6 is a flowchart illustrating, in detail, a processing for measuring the environmental sound shown in FIG. 5.

FIG. 6 illustrates the processing for measuring the environmental sound at step S11.

First, the signal processing unit 10 sets values necessary for measuring the environmental sound (step S1101). Specifically, the signal processing unit 10 initializes the time counter contained therein and inhibits the noise pattern learning request signal from being outputted to the hard disk drive 3. The signal processing unit 10 further inhibits capture of sound from the sound-receiving unit 12 and output of the noise-canceling sound through the sound source unit 13. The signal processing unit 10 further inhibits capture of the head operation data signal, and permits input/output of signals other than the noise pattern learning request signal and the head operation data signal.

Next, the signal processing unit 10 reads the halted state of the magnetic head 6 included in the noise pattern data stored in the nonvolatile memory unit 11, sets it as a noise pattern learning request signal pattern, and permits outputting the noise pattern learning request signal that is thus set as a pattern (step S1103). Thereby, the timer interrupt processing (step S7) is performed, and the noise pattern learning request signal is outputted through the processing at step S715 in FIG. 4. As a result, the operation of the magnetic head 6 is stopped, and only the rotational operation of the magnetic disk 5 is performed in the hard disk drive 3.

Next, the signal processing unit 10 stands by for a predetermined period of time (calming time) in which the hard disk drive 3 becomes calm (step S1105). This standby is conducted based on the timer and, besides, the timer interrupt processing (step S7) is conducted. As the time counter expires, therefore, the notice of expiration of the wait timer is issued at step S705 in FIG. 3. Upon receipt of this notice, the signal processing unit 10 starts capturing the noise from the sound-receiving unit 12 (step S1107). In this case, since the magnetic head 6 is not in operation, what are captured as noise are the sound generated by the rotation of the magnetic disk 5 and the external sound, i.e., the environmental noise.

The signal processing unit 10 further continues to capture the environmental sound for a predetermined period of time (time for measuring the environmental sound) (step S1109). The predetermined period of time is measured by the timer. Based on the notice of expiration of the wait timer issued through the timer interrupt processing (step S7), the signal processing unit 10 stops capturing the noise from the sound-receiving unit 12, and sets the value of the signal input/output flag to be the halted state (step S1111). The signal processing unit 10 executes the processing for picking up the characteristics such as the level and the change with the passage of time from the environmental sound that is received (step S1113), and returns (step S1115). Based on the characteristics of environmental sound picked up at step S1113, the environmental sound is estimated at step S4 in FIG. 2.

Figure 7:
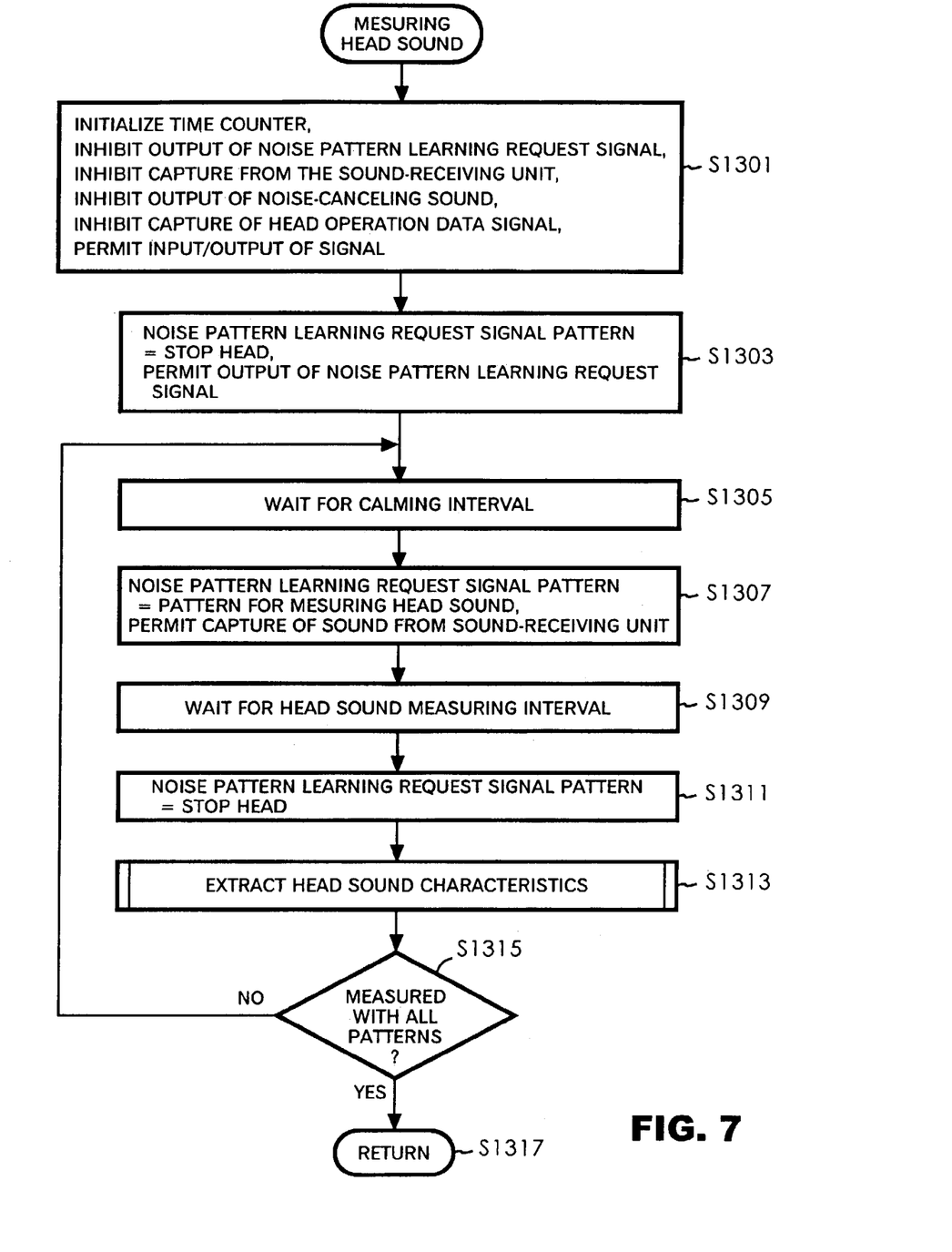
FIG. 7 is a flowchart illustrating, in detail, a processing for measuring the head sound shown in FIG. 5.

FIG. 7 illustrates in detail the processing for measuring the head sound at step S13.

First, the signal processing unit 10 sets the values necessary for measuring the environmental sound (step S1301). Specifically, the signal processing unit 10 initializes the time counter contained therein and inhibits the noise pattern learning request signal from being outputted to the hard disk drive 3. The signal processing unit 10 further inhibits the capture of sound from the sound-receiving unit 12 and inhibits the output of the noise-canceling sound through the sound source unit 13. The signal processing unit 10 further inhibits the capture of the head operation data signal, and permits the input/output of signals other than the noise pattern learning request signal and the head operation data signal.

Next, the signal processing unit 10 reads the noise pattern data stored in the nonvolatile memory unit 11 to set the noise pattern learning request signal pattern as the halted state of the magnetic head 6, and permits outputting the noise pattern learning request signal that is set as the pattern (step S1303). As a result, the noise pattern learning request signal is outputted to the hard disk drive 3 through the timer interrupt processing (step S7). Therefore, the magnetic head 6 stops operating, and the magnetic disk 5 only rotates in the hard disk drive 3. Next, the signal processing unit 10 stands by for a predetermined period of time (calming time) in which the hard disk drive 3 becomes calm (step S1305). This standby is conducted based on the timer. As the time counter expires, therefore, the notice of expiration of the wait timer is issued through the timer interrupt processing (step S7). Based on this notice, therefore, the signal processing unit 10 reads, from the nonvolatile memory unit 11, the operation pattern (pattern for measuring the head sound) of the magnetic head 6 used for measuring the head sound, sets it as the noise pattern learning request signal and starts capturing the noise from the sound-receiving unit 12 (step S1307). In this case, since the magnetic head 6 is driven in a pattern for measuring the head sound, there are captured, as noise, the operational sound of the magnetic head in addition to the environmental sound.

The signal processing unit 10 further continues to capture the environmental sound for a predetermined period of time (time for measuring the head sound) (step S1309). The predetermined period of time is measured by the timer. Based on the notice of expiration of the wait timer issued through the timer interrupt processing (step S7), the signal processing unit 10 sets the noise pattern learning request signal as the halted state of the head (step S1311). Accordingly, the magnetic head 6 stops operating. The signal processing unit 10, then, executes the processing for picking up the characteristics such as the level and the change with the passage of time from the head sound that is captured (step S1313), and judges whether the patterns for measuring the head sound stored in the nonvolatile memory unit 11 have all been measured (step S1315). When the patterns have not all been measured, the flow returns to step S1305 to repeat the subsequent steps. If it is judged at step S1315 that the patterns have all been measured, the flow returns to the flowchart of FIG. 5 (step S1317).

Figure 8:
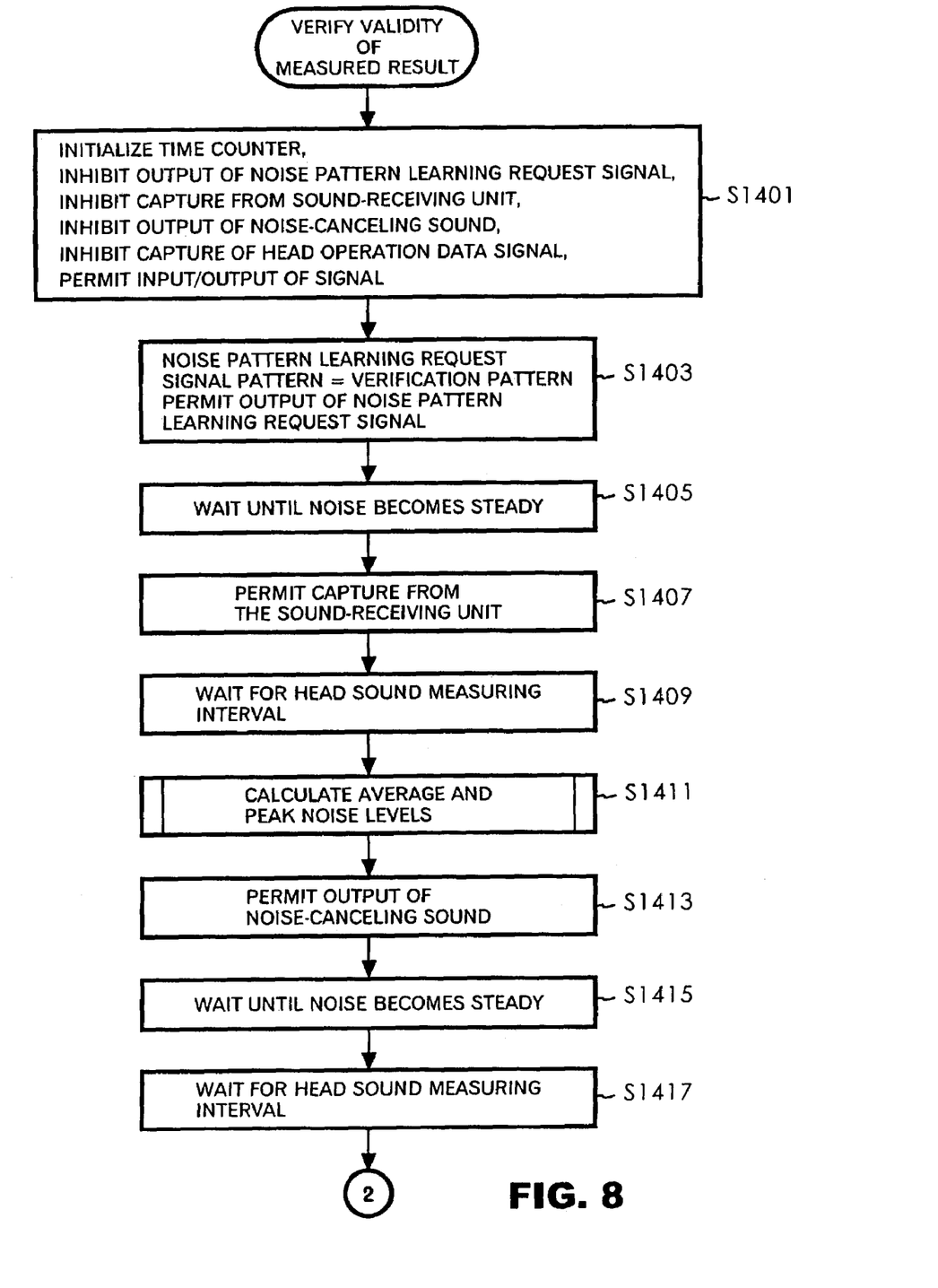
FIG. 8 is a flowchart illustrating, in detail, a processing for verifying the validity of the measured result shown in FIG. 5.
Figure 9:
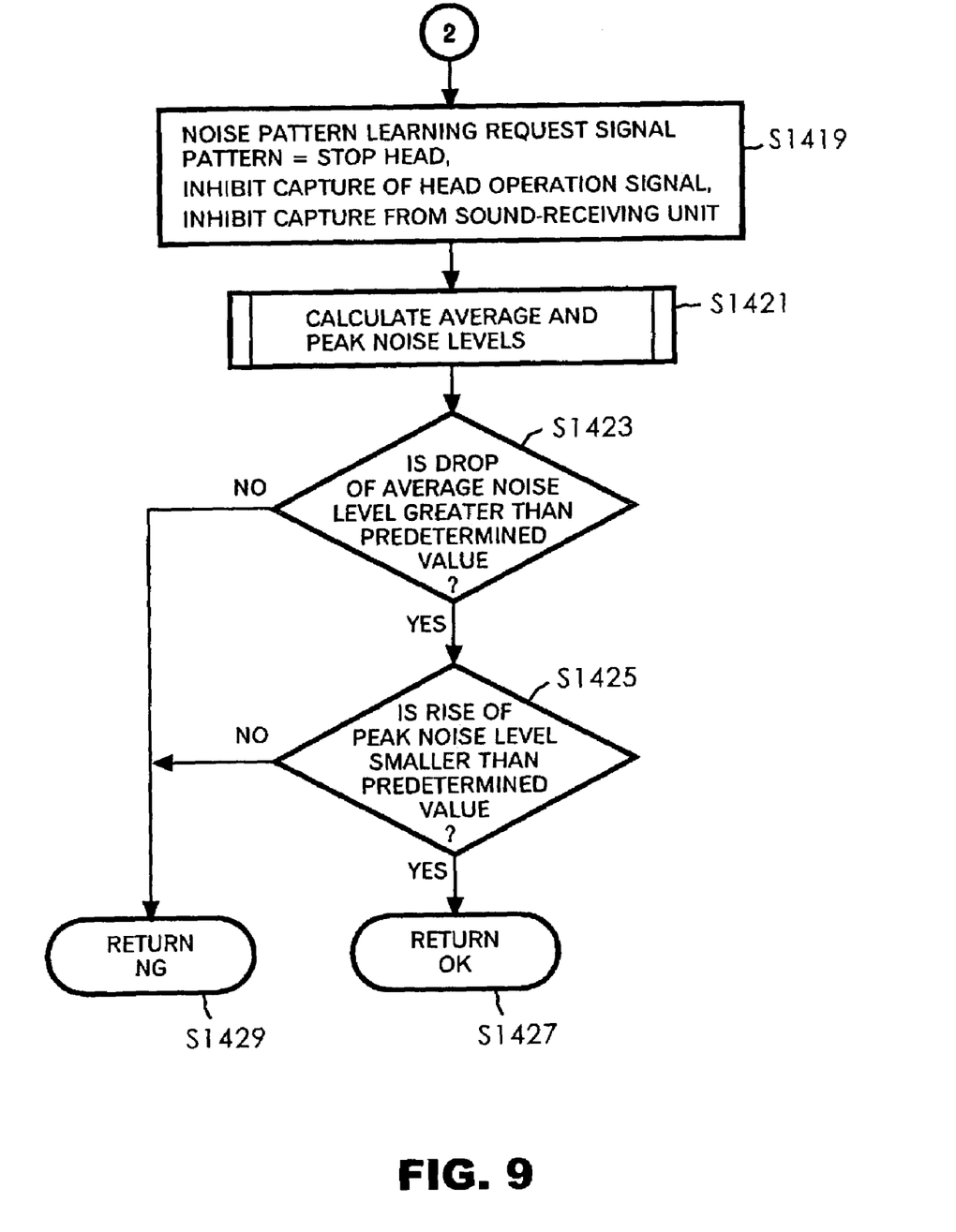
FIG. 9 is a flowchart illustrating a processing that follows the processing of FIG. 8.

FIGS. 8 and 9 illustrate the processing for verifying the validity of the result of measurement at step S14.

As shown in FIG. 8, first, the signal processing unit 10 sets the values necessary for verifying the validity of the result of measuring the noise (Step 1401). Specifically, the signal processing unit 10 initializes the time counter contained therein and inhibits the noise pattern learning request signal from being outputted to the hard disk drive 3. The signal processing unit 10 further inhibits the capture of sound from the sound-receiving unit 12 and inhibits the output of the noise-canceling sound through the sound source unit 13. The signal processing unit 10 further inhibits the capture of the head operation data signal, and permits the input/output of signals other than the noise pattern learning request signal and the head operation data signal.

Next, the signal processing unit 10 reads the noise pattern data stored in the nonvolatile memory unit 11, sets the noise pattern learning request signal pattern as a verification pattern for verifying the validity of the measured result, and permits outputting the noise pattern learning request signal that is thus set as the pattern (step S1403). As a result, a noise pattern learning request signal is outputted to the hard disk drive 3 from the signal processing unit 10 through the timer interrupt processing (step S7). In this case, the magnetic head 6 stops operating, and the magnetic disk 5 only rotates in the hard disk drive 3.

Next, the signal processing unit 10 stands by for a predetermined period of time until the noise of the magnetic head 6 which undergoes a predetermined operation becomes steady (step S1405). This standby is conducted based on the timer and, besides, a notice of expiration of the wait timer is issued through the timer interrupt processing (step S7) that is conducted accompanying the expiration of the time counter. Upon receipt of this notice, the signal processing unit 10 permits capturing noise from the sound-receiving unit 12, and whereby the noise is captured by the signal processing unit 10 from the sound-receiving unit 12. The signal processing unit 10 further continues to measure the head sound for a predetermined period of time (time for measuring the head sound). After the passage of the time for measuring the head sound (after the expiration of the wait timer is notified through the timer interrupt processing (step S7)), the signal processing unit 10 calculates an average level and a peak noise level from the captured noise (step S1411). This makes it possible to grasp the characteristics of noise generated when the magnetic head 6 is operated according to the verification pattern that has been set in advance.

The signal processing unit 10 sets the noise-canceling sound output permission flag to a value of the permitted state to thereby permit outputting the noise-canceling sound (step S1413). Then, the timer interrupt processing (step S7) is conducted, and the noise-canceling sound is outputted from the speaker 14. In this case, the noise pattern learning request signal, too, has been outputted, and the magnetic head 6 continues to operate. Therefore, the noise-canceling sound works to cancel the noise from the magnetic head 6.

Thereafter, the signal processing unit 10 stands by until the cancellation of the sound by the noise-canceling sound becomes steady (step S1415). Thereafter, the signal processing unit 10 stands by for a period of time for measuring the head sound (step S1417). During this period, the sound is measured by the sound-receiving unit 12 after the noise from the magnetic head 6 is cancelled by the noise-canceling sound.

Referring to FIG. 9, further, the signal processing unit 10 sets the noise pattern learning request signal pattern to be the head halting state and, further, sets the flag related to capturing the head operation signal to be the inhibited state. The signal processing unit 10 further sets the capture of signal from the sound-receiving unit 12 to be of the inhibited state (step S1419). Then, the timer interrupt processing (step S7) is effected to bring the magnetic head 6 into a halt and to bring into a halt the capture of the head operation signal by the signal processing unit 10. The capture of sound from the sound-receiving unit 12 is also halted.

The signal processing unit 10 further calculates an average level of the noise of when the noise of the magnetic head 6 is cancelled by the noise-canceling sound and a peak noise level (step S1421). Next, the signal processing unit 10 compares the result at step S1421 with the result calculated at step S1411. That is, the signal processing unit 10 judges whether a drop in the average noise level is larger than a predetermined value (step S1423). If it is judged that the drop is greater the predetermined value, it is, then, judged weather a rise in the peak noise level is within the predetermined value (step S1425). If it is judged that the increase in the peak noise level is within the predetermined value, it is regarded that the measured result is valid (OK) and the routine returns (step S1427). If it is judged at step S1423 that the drop in the average noise level is smaller than the predetermined value and when it is judged at step S1425 that the rise in the peak noise level lies outside the predetermined value, it is so judged that the measured result is not valid (NG), and the routine returns (step S1429).

In the processing for verifying the validity of the measured result (step S14), If it is judged that the measured result is not valid, the volume of the noise-canceling sound is reduced by one level at step S16 in FIG. 2, and the steps that follow the head sound measuring processing (step S13) are executed again. Accordingly, the processing for verifying the validity of the measured result (step S14) is continued until the volume of the noise-canceling sound assumes a proper value.

In this embodiment as described above, the hard disk drive 3 sends an operation data signal representing the operational state thereof when it is in operation, to the active noise canceller 4. Besides, based on the operation data signal input from the hard disk drive 3, the active noise canceller 4 outputs a noise-canceling sound while making a reference to the relationship between the operational state of the hard disk drive 3 and the noise stored in the nonvolatile memory unit 11. Unlike the prior art, therefore, the noise-canceling sound that is to be generated can be easily operated based on the operation data signal that is outputted in advance from the hard disk drive 3 without starting the operation of the noise-canceling sound, after the noise is captured, for the impulse-like noise that is generated from the hard disk drive 3. In operating the noise-canceling sound that is to be generated, therefore, the signal processing unit 10 does not require a high degree of response characteristics for the processing of signals, making it possible to cheaply realize a function for reducing the noise.

In this case, in particular, the operation data signal outputted from the hard disk drive 3 is outputted as a signal representing the operational state of the head. Therefore, the active noise canceller 4 easily recognizes the operation of the head which is a principal cause of generating the impulse-like noise (unsteady noise) from the hard disk drive 3, and the noise can be effectively suppressed.

On the other hand, the active noise canceller 4 detects the noise (environmental sound, steady noise) other than the noise generated by the operation of the magnetic head 6, and calculates the noise-canceling sound based on the characteristics of the environmental sound that is detected. It is therefore made possible to effectively suppress even the steady noise such as the sound of rotation of the magnetic disk 5 and other external sound.

According to this embodiment, further, the active noise canceller 4 causes the hard disk drive 3 to perform a predetermined operation based on the initial learning processing (step S1), i.e., based on the noise pattern learning request signals comprising a plurality of patterns stored in the nonvolatile memory unit 11, receives the noise generated through the sound-receiving unit 12, receives the head operation data signal from the hard disk drive 3, and stores, in the nonvolatile memory unit 11, the operational state of the hard disk drive 3 in relation to the received sound signal (noise) from the sound-receiving unit 12. Being requested by the active noise canceller 4, therefore, the typical operation of the hard disk drive 3 is stored in the memory unit, and the noise through the active noise canceller 4 is easily estimated.

When the noise-canceling sound is outputted in the active noise canceller 4, the signal processing unit 10 works as a level judging unit for judging whether the reduced noise of the hard disk drive 3 is smaller than a predetermined level. Namely, the signal processing unit 10 judges the validity of whether the noise is reduced by the noise-canceling sound, and assures the performance for reducing the noise by the noise-canceling sound. In this case, in particular, the signal processing unit 10 judges whether the drop in the average noise level is larger than the predetermined value and whether the rise in the peak noise level is within the predetermined value. If not, the volume of the noise-canceling sound is reduced by one level to reliably lower the average noise level and to minimize an increase in the peak noise level. Therefore, even when the physical properties of the magnetic disk 5 have so changed that the estimation algorithm of the active noise canceller 4 is no longer capable of coping therewith, the noise does not increase, and the performance for reducing the noise is stably maintained.

In the foregoing was described the embodiments of the invention. However, the invention is in no way limited to the above embodiments only but may employ any other constitution without departing from the gist and scope of the invention.

In the above embodiments, for example, the nonvolatile memory unit 11 has stored a relationship between the noise generated by the hard disk drive 3 and the operational state of the hard disk drive 3 which is learned by the signal processing unit 10, and has stored the noise pattern learning request signal pattern. Not being limited thereto, however, such data may be stored in the magnetic disk 5 in the hard disk drive 3. In this case, it is desired to connect the volatile memory, instead of the nonvolatile memory unit 11, to the signal processing unit 10, and to read out the data stored in the magnetic disk 5 into the volatile memory during the processing that is really conducted by the signal processing unit 10. In this case, the nonvolatile memory unit 11 can be replaced by an inexpensive volatile memory making it possible to reduce the cost of the hard disk device 1.

In the above embodiments, further, the speaker 14 is provided inside the housing 2. Not being limited thereto, however, the speaker 14 may be constituted integrally with the housing 2.

By integrally constituting the speaker 14 and the housing 2, it is allowed to save space for a portion where the speaker 14 is installed and, besides, the housing 2 as a whole can be vibrated to generate the noise-canceling sound thereby to favorably reduce the noise propagating to the outer side of the housing 2 in any direction irrespective of the directivity of the speaker 14.

In the above embodiments, further, the rotation of the magnetic disk 5 of the hard disk drive 3 may be discontinued by utilizing the function for saving the electric power. In this case, the magnetic head 6 does not operate and, besides, the environmental sound reduces. Therefore, the operation by the active noise canceller 4 is the operation for reducing the environmental sound only.

The above embodiments have dealt with reducing the noise of the hard disk drive 3. Not being limited thereto only, however, the present invention may be applied to reducing the noise of other disk storage devices, such as CD-ROM drive and the like.

It is also allowable to selectively employ the constitutions described in the above embodiments or to suitably change the constitution into other constitutions without departing from the gist and scope of the invention.

According to this invention as described above, it is allowed to realize a disk storage unit having excellent performance for suppressing the noise without increasing the cost.

We claim:

1. A noise reduction system comprising:
a disk storage unit including a disk capable of storing data and a head writing or reading said data to or from said disk;
an active noise canceller generating a noise-canceling sound which reduces a noise generated by said disk storage unit; and
a memory unit storing relationship between operational states and noises in said disk storage unit, wherein said disk storage unit outputs to said active noise canceller an operation data signal representing an operational state of said disk storage unit when it operates; and a said active noise canceller generates said noise-canceling sound by referring to said relationship stored in said memory unit based on said operation data signal outputted from said disk storage unit, and said active noise canceller detects a different noise other than said noise generated by the operation of said head, and determines said noise-canceling sound based on the characteristics of said different noise.

2. A noise reduction system according to claim 1, wherein said disk storage unit outputs said operation data signal as a signal that represents said operational state of said head.

3. A noise reduction system according to claim 1, wherein said active noise canceller receives said noise generated when said disk storage unit has performed a predetermined operation, and stores said noise in said memory unit in connection with the operational state of said disk storage unit, so that the relationship between the operational state of said disk storage unit and said noise is stored in said memory unit.

4. A noise reduction system according to claim 3, wherein said disk storage unit performs said predetermined operation based on a request signal outputted by said active noise canceller, said active noise canceller outputs request signals with a plurality of patterns, and said memory unit stores relationships between a plurality of operational states of said disk storage unit corresponding to said plurality of patterns and noises generated in said plurality of operational states.

5. A disk storage comprising:
a disk storage unit having a disk capable of storing data;
a vibration-generating unit generating vibration for reducing an operational sound generated by said disk storage unit;
a sound-receiving unit receiving the operational sound which said disk storage unit generates at the time of driving, and outputting to said vibration-generating unit an operational sound signal based on said operational sound;
a memory unit storing, in an associative manner, said operational state and a received sound signal based on the operational sound generated when said disk storage unit is operated in a predetermined operational state, wherein said vibration-generating unit generates said vibration based on said operational sound signal outputted by said sound-receiving unit and the relationship between said sound receiving signal and said operational state stored in said memory unit; and
a level judging unit which, when said vibration-generating unit has generated the vibration for reducing the operational sound generated by said disk storage unit, detects the operational sound reduced by said vibration from said operational sound signal outputted by said sound-receiving unit, and judges whether said operational sound is smaller than a predetermined level.

6. A disk storage according to claim 5, wherein said level judging unit adjusts the level of said vibration to be generated by said vibration-generating unit when said operational sound reduced by said vibration is not smaller than said predetermined level.

7. A disk storage according to claim 5, further comprising a housing containing at least said disk storage unit, wherein said vibration-generating unit is formed integrally with said housing.

8. A disk storage according to claim 5, wherein said memory unit is present on said disk that constitutes said disk storage unit.

9. A noise reduction method comprising:
a first step of causing a hard disk drive to perform a predetermined operation and receiving a noise generated due to said predetermined operation;
a second step of storing said noise received and said predetermined operation in an associative manner;
a third step of identifying an operational state of said hard disk drive in a predetermined driving period; and
a fourth step of identifying said predetermined operation corresponding to said operational state identified in said third step, and outputting a noise-canceling sound for reducing said noise corresponding to said predetermined operation;
a fifth step of receiving a noise reduced as a result of outputting said noise-canceling sound in said fourth step; and
a sixth step of comparing said noise received in said first step with said noise received in said fifth step to verify validity of the characteristics of said noise-canceling sound outputted in said fourth step.

10. A noise reduction method according to claim 9, wherein:
said first step receives a unsteady noise generated when said hard disk drive is caused to perform a predetermined unsteady operation, and a steady noise generated when said hard disk drive is caused to perform a predetermined steady operation;
said second step stores said unsteady noise received and said unsteady operation in an associative manner;
said third step identifies the unsteady operational state and/or steady operational state of said hard disk drive during a predetermined driving period; and
said fourth step outputs a first noise-canceling sound for reducing said unsteady noise corresponding to said unsteady operation and a second noise-canceling sound for reducing said steady noise corresponding to said steady operation.

11. A noise reduction method according to claim 9 wherein, when an average level of said noise received in said first step is smaller than an average level of said noise received in said fifth step by more than a predetermined value, said sixth step judges that the characteristics of said noise-canceling sound outputted in said fourth step are valid.

12. A noise reduction method according to claim 9 wherein, when a rise in a peak level of said noise received in said first step is not greater than a predetermined value with respect to a peak level of said noise received in said fifth step, said sixth step judges that the characteristics of said noise-canceling sound outputted in said fourth step are valid.

13. A noise reduction system comprising:
a disk storage unit including a disk capable of storing data and a head writing or reading said data to or from said disk;
an active noise canceller generating a noise-canceling sound which reduces a noise generated by said disk storage unit;
a memory unit storing relationship between operational states and noises in said disk storage unit, wherein said disk storage unit outputs to said active noise canceller an operation data signal representing an operational state of said disk storage unit when it operates;
a said active noise canceller generates said noise-canceling sound by ref erring to said relationship stored in said memory unit based on said operation data signal outputted from said disk storage unit; wherein said active noise canceller receives said noise generated when said disk storage unit has performed a predetermined operation, and stores said noise in said memory unit in connection with the operational state of said disk storage unit, so that the relationship between the operational state of said disk storage unit and said noise is stored in said memory unit; and wherein said disk storage unit performs said predetermined operation based on a request signal outputted by said active noise canceller, said active noise canceller outputs request signals with a plurality of patterns, and said memory unit stores relationships between a plurality of operational states of said disk storage unit corresponding to said plurality of patterns and noises generated in said plurality of operational states.

14. A noise reduction system according to claim 13, wherein said disk storage unit outputs said operation data signal as a signal that represents said operational state of said head.

* * * * *

UNITED STATES PATENT AND TRADEMARK OFFICE
CERTIFICATE OF CORRECTION

PATENT NO. : 7,372,654 B2  Page 1 of 1
APPLICATION NO. : 10/346527
DATED : May 13, 2008
INVENTOR(S) : Yoshihiro Fujie and Yoshihiko Terashita It is certified that error appears in the above-identified patent and that said Letters Patent is hereby corrected as shown below:

Col 16, Ln 67: replace "ref erring" with --referring--

Signed and Sealed this

Twenty-second Day of July, 2008

JON W. DUDAS
*Director of the United States Patent and Trademark Office*